Oct. 26, 1926.
A. F. JOHNSON
RAKE ATTACHMENT
Filed August 8, 1922    2 Sheets-Sheet 1
1,604,167
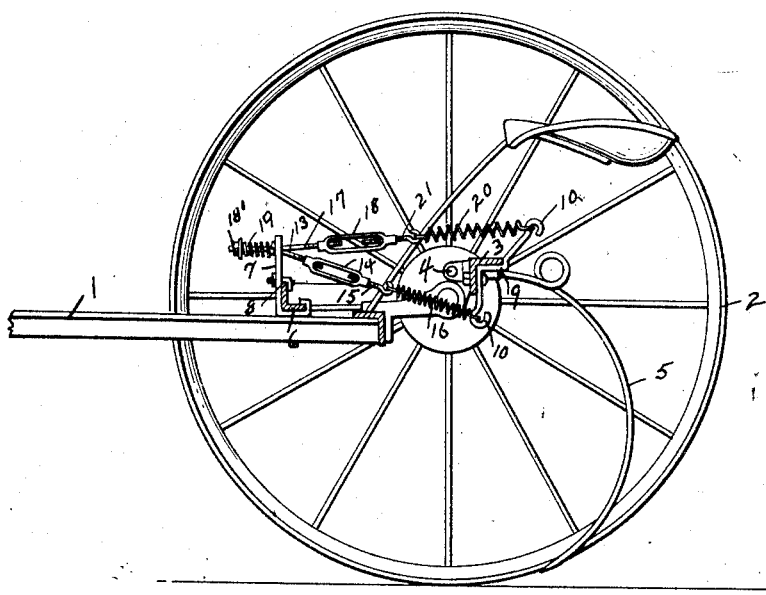
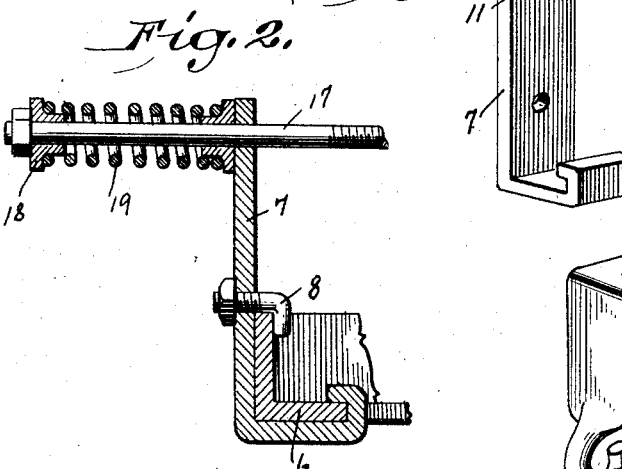
Inventor
Arthur F. Johnson Oct. 26, 1926.

A. F. JOHNSON 1,604,167

RAKE ATTACHMENT

Filed August 8, 1922   2 Sheets-Sheet 2

Inventor

Arthur F Johnson

Patented Oct. 26, 1926.

1,604,167

UNITED STATES PATENT OFFICE.

ARTHUR F. JOHNSON, OF LITTLE FALLS, MINNESOTA.

RAKE ATTACHMENT.

Application filed August 8, 1922. Serial No. 580,444.

This invention relates to improvements in hay rakes, and particularly to the type known as dumping rakes. One of the principal objects of my invention is to provide means whereby the rake teeth will be returned to the ground quickly after each operation of the rake teeth in the act of dumping.

A further object of my invention is to provide an attachment of the above indicated character for rakes whereby means are provided to permit the operator of the rake to adjust tensioning means to allow for a quick or slow return of the rake teeth to the ground after each dumping.

And a still further object of the invention is to provide an attachment for dumping rakes of the above indicated character, which is simple in construction and operation, durable, efficient for the purpose intended and one that can be manufactured and installed on a rake at a relatively low cost.

In the accompanying drawing:—

Figure 1 is a vertical section through the frame of a rake showing my attachment applied thereto.

Figure 2 is an enlarged fragmentary section of the compression spring and means for supporting same to the frame of the rake.

Figure 3 is a perspective view of the supporting plate for the compression spring.

Figure 4 is a perspective view of the angle-shaped plate to which the springs are connected.

Referring to the accompanying drawing in detail, like characters will be used to designate like parts in the different views.

Figure 5:
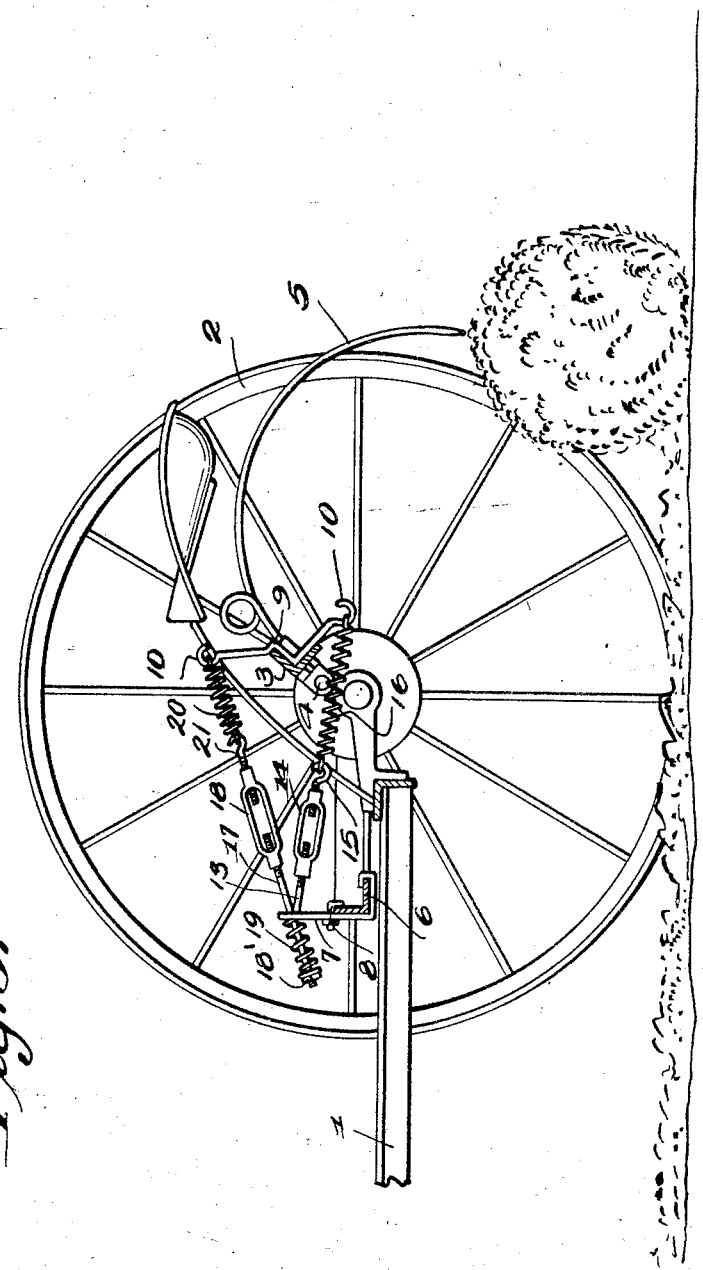
Figure 5 is a view similar to Figure 1, showing the rake teeth in an elevated position.

Referring now more particularly to the characters of reference on the drawing, the numeral 1 designates the main frame of the rake having the usual wheel 2 in connection with the rake head 3 which is hinged to the frame 1 by the usual hinges 4 and having rake teeth 5 attached thereto. Supported on the frame 1 is an angle iron 6, to which is attached a second angle iron 7 having a hook formed on one end for engagement with the angle iron 6 and a bolt 8 adapted to pass through the second angle iron 7 for engagement with the opposite edge of the angle iron 6, the purpose of which will be better understood as the description proceeds. Secured to the rake head 3, which is usually of angle iron construction, is an angle-shaped casting 9, one end of which extends above the rake head 3 and the opposite end of the angle-shape member extending downwardly to a plane parallel with the frame 1. Each end of the angle-shaped casting 9 is provided with a hook 10.

The L-shaped member 7 is provided adjacent the upper edge of same with apertures 11 and 12. A bolt 13 passes through the aperture 11, the head of the bolt engaging the outer side of same, as indicated in Figure 1 and the free end of the bolt which is threaded engages a turnbuckle 14. A second bolt 15 which is threaded at one end and provided with a hook on the opposite end has the threaded end engaged with the turnbuckle, while a return spring 16 is fastened between the hook on the bolt 15 and the hook on the bottom end of the angle-shaped member 9, thus it will be seen that when the rake teeth 5 are raised for the purpose of dumping the rake, the return spring 16 will automatically return the rake teeth quickly into engagement with the ground. By means of the turnbuckle 14 the tension of the spring 16 can be regulated.

A bolt 17 is adapted to pass through the aperture 12 and the threaded end of the bolt 17 engages a turnbuckle 18. The bolt 17 has a removable head 18', and between the head 18' and the angle iron 7 a compression spring 19 is positioned on the bolt 17. A control drop spring 20 is connected at one end to the hook 10 formed on the upper end of the angle-shaped member 9, while the opposite end of the control spring engages a hook formed on the end of a bolt 21, which is adapted to be screw threaded into the turnbuckle 18. Thus it can be readily seen that by adjustment of the turnbuckle 18, tension of the compression spring 19 and the control spring 20 can be regulated to prevent too rapid descent of the rake teeth 5 after being dumped, thus preventing the rake teeth from suddenly coming into contact with the ground and being broken, which is a great fault to be found with the present construction of power operated rakes. It is to be noted that when the rake teeth are swung to a raised position, due to the material contained thereon, that the point of connection of the rear end of the spring 16 is gradually swung upwardly, thus moving the same to a point almost directly in rear of the point of pivot 4, thus decreasing the efficiency of the spring 16 as the teeth are raised, so as to eliminate the teeth being returned to their raking position before the entire dumping is effected.

When the rake is in use and as the hay is accumulated against the teeth 5, the hay forms a bundle in front of the teeth, and as this bundle increases in size due to the accumulation of the hay, the lower side of the bundle remains in contact with the ground, and the hay which is being collected is forced in an upward direction, thus pressing against the underside of the upper portion of the teeth, and when the bundle is increased to such a size as to form a wedge, the teeth 5 are swung upwardly upon the pivot 4 and the teeth may slide over the top of the bundle which remains in a fixed position upon the ground. As soon as the pointed ends of the teeth pass over the top of the bundle, the teeth swing back to the normal position as shown in Figure 1 of the drawing, thus accomplishing the dumping of the hay and the return of the teeth to normal position without subjecting the teeth to force of impact with the surface of the ground.

While I have shown and described the preferred form of my invention, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

A rake comprising a frame, an L-shaped plate supported upon the frame, a head pivotally mounted upon the frame and carrying teeth, a bracket fixed to the head and disposed transversely thereof, longitudinally extensible elements passing at one end through the plate and connected at their opposite ends with the ends of the bracket, the said longitudinally extensible elements being disposed one at each side of the head and the pivot which connects the head with the frame, one of the said elements having an abutment mounted thereon and a spring interposed between the said abutment and the plate and means for adjusting the length of said elements.

In testimony whereof, I have affixed my signature.

ARTHUR F. JOHNSON.